US010973206B2

(12) United States Patent
Friedgood et al.

(10) Patent No.: US 10,973,206 B2
(45) Date of Patent: Apr. 13, 2021

(54) PET TRAVEL LUGGAGE AND PET CARRIER CONFIGURED TO ORGANIZE PET ESSENTIALS FOR AN EXTENDED DURATION

(71) Applicant: Overland, LLC, Santa Monica, CA (US)

(72) Inventors: Alan Friedgood, Delray Beach, FL (US); Linda Staffin El-Fakir, Edison, NJ (US)

(73) Assignee: OVERLAND, LLC., Santa Monica, CA (US)

( * ) Notice: Subject to any disclaimer, the term of this patent is extended or adjusted under 35 U.S.C. 154(b) by 0 days.

(21) Appl. No.: 16/791,973

(22) Filed: Feb. 14, 2020

(65) Prior Publication Data
US 2020/0178497 A1    Jun. 11, 2020

Related U.S. Application Data

(63) Continuation-in-part of application No. 15/992,007, filed on May 29, 2018, now abandoned.

(60) Provisional application No. 62/556,174, filed on Sep. 8, 2017.

(51) Int. Cl.
*A01K 5/01* (2006.01)
*A45C 13/02* (2006.01)
*A01K 7/00* (2006.01)
*A45C 3/00* (2006.01)

(52) U.S. Cl.
CPC ............ *A01K 5/0114* (2013.01); *A01K 7/005* (2013.01); *A45C 13/02* (2013.01); *A45C 3/00* (2013.01)

(58) Field of Classification Search
CPC ......... A45C 13/02; A45C 3/00; A01K 5/0114; A01K 7/005
See application file for complete search history.

(56) References Cited

U.S. PATENT DOCUMENTS

| 369,472 | A | * | 9/1887 | Scheuer | |
| 1,491,807 | A | * | 4/1924 | McLinn | A45C 3/02 190/11 |
| 2,316,328 | A | * | 4/1943 | Guenther | A45C 3/02 190/124 |
| 3,850,144 | A | | 11/1974 | Borom et al. | |
| 4,119,181 | A | | 10/1978 | Jones | |
| 4,350,274 | A | | 9/1982 | Morgan | |
| 4,977,857 | A | | 12/1990 | Slawinski | |

(Continued)

*Primary Examiner* — Tri M Mai
(74) *Attorney, Agent, or Firm* — Gearhart Law LLC (57) ABSTRACT

Pet travel luggage and carriers configured to organize pet essentials for an extended duration are described. The luggage and the carrier include a body, a lid attached to the body at an opening, and a feeding station. The feeding station comprises a flexible fold down flap hinged to an outer edge of a side of the body proximate the bottom side. The flap deploys along a horizontal surface such that an interior surface of the flap receives a removable mat. The removable mat receives a pair of collapsible bowls. The flap is secured in a closed position to an outer surface of the side of the body by a fixation element. The luggage also includes a removable dividing panel that divides a hollow interior of the body into at least two unsymmetrical sections. At least one of the at least two sections receives a pair of stackable containers.

17 Claims, 7 Drawing Sheets

(56) References Cited

U.S. PATENT DOCUMENTS

| | | | | |
|---|---|---|---|---|
| 5,173,346 | A | * | 12/1992 | Middleton ............ A61G 13/102 |
| | | | | 428/53 |
| 5,209,184 | A | | 5/1993 | Sharkan et al. |
| 5,265,719 | A | * | 11/1993 | Wand ....................... A45C 3/00 |
| | | | | 206/223 |
| 5,397,040 | A | | 3/1995 | Lee |
| 5,458,087 | A | | 10/1995 | Prior et al. |
| 5,573,166 | A | * | 11/1996 | Leja .......................... A45F 3/04 |
| | | | | 224/630 |
| 5,649,658 | A | * | 7/1997 | Hoffman ................... A45F 3/04 |
| | | | | 190/2 |
| 5,961,216 | A | | 10/1999 | Quinn et al. |
| 6,568,347 | B2 | | 5/2003 | Ciguere |
| 8,622,235 | B2 | | 1/2014 | Suchecki |
| 8,684,183 | B2 | | 4/2014 | Trannon |
| 9,462,874 | B1 | * | 10/2016 | Samuel ..................... A45C 13/02 |
| 9,756,919 | B2 | | 9/2017 | Murdoch et al. |
| 10,251,369 | B1 | | 4/2019 | Rozsa et al. |
| 2004/0149600 | A1 | | 8/2004 | Wolter et al. |
| 2005/0224305 | A1 | | 10/2005 | Davis |
| 2006/0254952 | A1 | * | 11/2006 | Trevino ................. B65D 85/18 |
| | | | | 206/581 |
| 2007/0228097 | A1 | * | 10/2007 | Recanati ................. B60R 7/043 |
| | | | | 224/580 |
| 2010/0140279 | A1 | * | 6/2010 | Tyson ................... B65D 21/086 |
| | | | | 220/666 |
| 2015/0173473 | A1 | * | 6/2015 | Jenkins ................... A45C 3/001 |
| | | | | 190/1 |

* cited by examiner

PET TRAVEL LUGGAGE AND PET CARRIER CONFIGURED TO ORGANIZE PET ESSENTIALS FOR AN EXTENDED DURATION

CROSS-REFERENCE TO RELATED APPLICATIONS

This application is a U.S. Continuation-in-Part patent application that claims priority to U.S. Non-Provisional patent application Ser. No. 15/992,007 filed on May 29, 2018, which claims priority from U.S. Provisional Application Ser. No. 62/556,174 filed on Sep. 8, 2017, the entire contents of which are hereby incorporated by reference.

FIELD OF THE EMBODIMENTS

The field of the invention and its embodiments relate to pet travel luggage and a pet carrier that can be configured to organize pet essentials for an extended duration trip. In particular, the present invention and its embodiments provide pet travel luggage and a pet carrier for pet supplies that can be toted or carried easily and comfortably, while providing all essential supplies to care for and feed a pet.

BACKGROUND OF THE EMBODIMENTS

Bags, such as suitcases, backpacks, and duffle bags, for carrying and storing personal items and/or infant care supplies are well known and used frequently when traveling. However, it is becoming increasingly popular for pet owners to "humanize" their pets and treat their pet like a member of the family or like their child. This results in taking the pet wherever the owner goes, such as on day trips and/or vacations. Resorts and hotels increasingly cater to and accommodate pet travelers. However, the enhanced attention placed on pet travelers' results in a need for the pet owner to plan not only for himself/herself, but for the pet when traveling.

As pet owners can attest, tending to a pet, such as a canine or a cat, while away from the home can be a trying endeavor. Whether traveling on vacation or simply out for a day, there can be a variety of items that the pet owner needs to bring to meet the pet's daily needs. For example, a pet requires frequent water and food, and may also periodically need medicine, weather gear, a leash, treats, toys, and the like.

When traveling, the pet owner will typically throw some pet products in a bag and leave the house, only to learn later that an important pet care item was left at home. At this point, the pet owner must attempt to remedy the problem of the left-behind item, which sometimes may not be possible (e.g., in the case of medicine left at home). In other situations, the pet owner may attempt to purchase the item (e.g., pet food, bedding, towels, apparel, etc.). However, a small quantity of pet food, or the specific type of pet food, may not always be available for purchase, and furthermore, additional items will also need to be separately purchased, such as a source of water and appropriate sized pet bowls. In any event, the pet owner wants to be able to provide an appropriate meal for the pet when away from home, which the pet is accustomed to eating and in a proper amount, without any fuss or inconvenience.

Thus, a need exists for a convenient way in which to carry all of the supplies necessary for taking care of an animal while traveling away from home. A need exists for both convenient and lightweight travel luggage and a pet carrier, specifically designed to meet the needs of a pet owner, in which a complete set of pet necessities can be easily transported or carried while traveling with a pet. The present invention and its embodiments meet and exceed these objectives by providing a piece of pet travel luggage and a pet carrier that can be configured to organize pet essentials for a trip having an extended duration. Moreover, the present invention and its embodiments meet and exceed these objectives by providing pet travel luggage and a pet carrier for pet supplies that can be toted or carried easily and comfortably, while providing all essential supplies to care for and feed a pet. Further, the present invention and its embodiments meet and exceed these objectives by providing a pet carrier and/or a piece of pet travel luggage that is "right-sized" or directly sized to meet the needs of the pet based on size and/or weight of the pet.

REVIEW OF RELATED TECHNOLOGY

U.S. Pat. No. 3,850,144 A discloses a pet carrier bag made from a durable woven fabric. The bag comprises a stiff, removable binder board covered with a plastic coating which forms a bottom for the carrier. An upstanding wall is secured to the board and receives an absorbent pad. The board and the pads are held within the bag by snaps. A top portion of the bag is zippered, while one side wall of the bag includes an opening through which a pet's head extends.

U.S. Pat. No. 4,350,274 A discloses a complete package including a carrying bag for articles packaged therein for taking care of a household animal while traveling. The package includes a flexible bag with a dish, utensils and containers confined within the bag for taking care of the animal's needs when away from home.

U.S. Pat. No. 4,977,857 A discloses a pet carrier bag which includes a flexible body having a zippered top portion. A closable pocket is provided on one side of the bag and the bag includes two carrying straps. The carrier provides either an opening for the animal's head to extend through or an open mesh that may be placed over the opening.

U.S. Pat. No. 5,265,719 A discloses pet luggage. The pet luggage includes an elongated main compartment with outside pockets at the ends of the main compartment, thereby making the luggage extremely long as compared to its width but more comfortably carried than shorter luggage of comparable volume. One outside pocket is for a leash, and the other is for fecal clean-up equipment. The main compartment is protectively closed by three separate fastening systems, two of which are zippers for lowering a front panel of the main compartment and one of which is Velcro-type for holding the top panel in covering position over the main compartment. Unfastening any one of the three separate fastening systems gives access to the main compartment. The top and bottom panels are stiffened to relatively reduce their pliability as compared to other panels. Padding of panels is employed to enhance comfort as the luggage bumps against a person carrying it. Within the main compartment are such items as a towel holder, pockets for grooming items, and a medicine container. Food and water containers are held in shaped holders.

U.S. Pat. No. 6,568,347 B2 discloses a travel container that is a disposable package in the form of a kit for the storage of a predefined quantity of drinking water and a predefined quantity of pet food in independent pouches to form a predefined meal for a pet dog or pet cat when traveling on a short excursion. The travel container includes, in combination, an open receptacle having a relatively deep compartment with a flat bottom and a large opening for storing a supply of pet food in a closed pouch, a separate sealed pouch in which a source of water is stored and a cover lid for closing the open receptacle. The supply of pet food and the source of water are present in proportional amounts to form a predefined convenience pet meal upon opening the pouch of pet food and the water pouch and combining the water with the pet food.

Various pet travel bags are known in the art. However, their structure and means of operation are substantially different from the present disclosure, as the other inventions fail to solve all the problems taught by the present disclosure. Moreover, known pet travel bags are stiff or rigid, and are not customizable. Further, some of the known pet travel bags are even disposable, and therefore, only usable once.

The field of the invention and its embodiments relate to pet travel luggage and a pet carrier that can be configured to organize pet essentials for a trip having an extended duration. In particular, the present invention and its embodiments provide pet travel luggage and a pet carrier for pet supplies that can be toted or carried easily and comfortably, while providing all essential supplies to care for and feed a pet. Multiple embodiments of this invention are presented in the drawings and will be described in more detail herein.

SUMMARY OF THE EMBODIMENTS

The present invention and its embodiments relate to pet travel luggage and a pet carrier that can be configured to organize pet essentials for a trip having an extended duration. In particular, the present invention and its embodiments provide pet travel luggage and a pet carrier for pet supplies that can be toted or carried easily and comfortably, while providing all essential supplies to care for and feed a pet.

A first embodiment of the instant invention describes a piece of pet travel luggage configured to organize pet essentials. The piece of pet travel luggage includes a flexible walled hauler tote. The flexible walled hauler tote includes a body and a lid. The body comprises a hollow interior compartment formed by a first side disposed opposite a second side, a third side disposed opposite a fourth side, and a bottom side disposed opposite an opening. The lid is attached to the body at the opening of the fourth side. The piece of pet travel luggage also includes a first fixation element configured to secure the lid to the body to open or close the flexible walled hauler tote.

Moreover, the piece of pet travel luggage additionally includes at least one removable or adjustable vertical dividing panel configured to divide the hollow interior compartment into at least two sections. The at least two sections of the hollow interior compartment are unsymmetrical. At least one of the at least two sections is configured to receive a pair of containers. The pair of containers are stackable in the at least one of the at least two sections. Further, each container of the pair of containers is identical in size. It should be appreciated that a size of each container of the pair of containers is sized to match an amount of food needed for the pet based on the weight of the pet and a specified time period (e.g., a time period when the pet owner and the pet are away from the home).

The piece of pet travel luggage also includes a feeding station. The feeding station includes a flexible fold down flap hinged to an outer edge of the third side proximate the bottom side. The flexible fold down flap comprises a fabric material. The flexible fold down flap is configured for deployment along a horizontal surface. An interior surface of the flexible fold down flap receives and houses a removable mat in place with four elastic straps such that one strap spans each of the four corners of the flexible fold down flap. The removable mat comprises a semi-flexible anti-skid material laminated to a nonporous plastic surface. It is hand washable. According to examples, the removable mat comprises an ethylene-vinyl acetate (EVA foam) with a polypropylene (PP) sheet top surface.

The removable mat is configured to receive a pair of collapsible bowls. Each bowl of the pair of collapsible bowls houses a liquid or a food. This pair of collapsible bowls comprise a dishwasher-safe material. According to examples, the material comprising the pair of collapsible bowls is silicone. Each bowl of the pair of collapsible bowls is identical in size. A size of each bowl of the pair of collapsible bowls is sized to match the size of the pet. It should be appreciated that the size of the piece of pet travel luggage correlates to a size of the pair of collapsible containers and a size of the pair of collapsible bowls, and therefore, correlates to a size and weight of the pet that the piece of pet travel luggage is transporting.

Moreover, the flexible fold down flap is secured in a closed position to an outer surface of the third side by a second fixation element. In some examples, the pair of collapsible bowls may be collapsed and secured to an interior surface of the flexible fold down flap by the elastic straps for storage. Specifically, each of the elastic straps are precisely angled to allow the pair of collapsible bowls to be expanded and placed on the removable mat without removing the removable mat from the flexible fold down flap while maintaining complete contact between the non-skid base of the pair of collapsible bowls and the smooth hard plastic surface of the removable mat.

A second embodiment of the instant invention describes a backpack configured to carry pet supplies. The backpack includes a body that comprises a hollow interior compartment formed by a first side disposed opposite a second side, a third side disposed opposite a fourth side, and a bottom side disposed opposite an opening. The backpack also includes a lid attached to the body at the opening of the fourth side. A first fixation element is configured to secure the lid to the body to open or close the backpack.

The backpack also includes at least one removable dividing panel configured to divide the hollow interior compartment into at least two sections. The at least two sections are unsymmetrical. At least one of the at least two sections is configured to receive a pair of containers. The pair of containers are stackable in the at least one of the at least two sections. Further, each container of the pair of containers is identical in size. Moreover, a size of each container of the pair of containers is sized to match an amount of food needed for the pet based on the weight of the pet and a specified time period (e.g., a time period when the pet owner and the pet are away from the home).

Similar to the piece of pet travel luggage and the pet carrier, the backpack further includes the feeding station. The feeding station includes the flexible fold down flap hinged to the outer edge of the third side proximate the bottom side. The flexible fold down flap comprises the fabric material. The flexible fold down flap is configured for deployment along the horizontal surface. The interior surface of the flexible fold down flap receives and houses the removable mat in place with elastic straps spanning four corners of the flexible fold down flap. The removable mat comprises the semi-flexible anti-skid material laminated to the nonporous plastic surface, and is hand-washable. According to examples, the removable mat comprises the EVA form with a PP sheet top surface.

The removable mat is configured to receive the pair of collapsible bowls. Each bowl of the pair of collapsible bowls houses the liquid or the food. This pair of collapsible bowls comprise a dishwasher-safe material. According to examples, the material comprising the pair of collapsible bowls is silicone. Each bowl of the pair of collapsible bowls is identical in size. The size of each bowl of the pair of collapsible bowls is sized to match the size of the pet. It should be appreciated that the size of the backpack correlates to the size of the pair of collapsible containers and the size of the pair of collapsible bowls.

Moreover, the flexible fold down flap is secured in a closed position to the outer surface of the third side by the second fixation element. In some examples, the pair of collapsible bowls may be collapsed and secured to an interior surface of the flexible fold down flap by the elastic straps for storage. Specifically, each of the elastic straps are precisely angled to allow the pair of collapsible bowls to be expanded and placed on the removable mat without removing the removable mat from the flexible fold down flap while maintaining complete contact between the non-skid base of the pair of collapsible bowls and the smooth hard plastic surface of the removable mat.

The backpack also includes at least one strap attached to the fourth side at a first location proximate the opening and a second location proximate the bottom side. The backpack further includes a flap located over the feeding station. The flap comprises a zippered pocket configured to house at least a supply of bags. The flap also includes a dispenser configured to receive the supply of bags from the zippered pocket for use by the pet owner.

A third embodiment of the instant invention describes a pet carrier. The pet carrier is configured to house and/or transport a pet. The pet carrier comprises a body. The body comprises a hollow interior compartment formed by a first side disposed opposite a second side, a third side disposed opposite a fourth side, and a bottom side disposed opposite an opening. The pet carrier also includes a lid attached to the body at the opening of the fourth side. A first fixation element is configured to secure the lid to the body to open or close the body.

Similar to the piece of pet travel luggage, the pet carrier also includes the feeding station. The feeding station includes the flexible fold down flap hinged to the outer edge of the third side proximate the bottom side. The flexible fold down flap comprises the fabric material. The flexible fold down flap is configured for deployment along the horizontal surface. The interior surface of the flexible fold down flap receives and houses a removable mat in place with four elastic straps such that one strap spans each of the four corners of the flexible fold down flap. The removable mat comprises the semi-flexible anti-skid material laminated to the nonporous plastic surface, and is hand-washable. According to examples, the removable mat comprises the EVA foam with a PP sheet top surface.

The removable mat is configured to receive the pair of collapsible bowls. Each bowl of the pair of collapsible bowls houses the liquid or the food. This pair of collapsible bowls comprise the dishwasher-safe material. According to examples, the material comprising the pair of collapsible bowls is silicone. Each bowl of the pair of collapsible bowls is identical in size. Additionally, the size of each bowl of the pair of collapsible bowls is sized to match the size of the pet. It should be appreciated that the size of the feeding station of the pet carrier correlates to the size of the pair of collapsible bowls.

Moreover, the flexible fold down flap is secured in the closed position to the outer surface of the third side by the second fixation element. In some examples, the pair of collapsible bowls may be collapsed and secured to the interior surface of the flexible fold down flap by the elastic straps for storage. Specifically, each of the elastic straps are precisely angled to allow the pair of collapsible bowls to be expanded and placed on the removable mat without removing the removable mat from the flexible fold down flap while maintaining complete contact between the non-skid base of the pair of collapsible bowls and the smooth hard plastic surface of the removable mat.

In general, the present invention succeeds in conferring the following benefits and objectives.

It is an object of the present invention to provide a piece of pet travel luggage and a pet carrier that includes a feeding station, where the feeding station includes a flexible fold down flap hinged to an outer edge of a side of a body of the piece of pet travel luggage and the pet carrier proximate the bottom side, the flap being configured for deployment along a horizontal surface and configured for securement in a closed position to an outer surface of the side of the body of the piece of pet travel luggage and the pet carrier by a fixation element, where an interior surface of the flap is configured to receive an anti-skid removable mat, the removable mat being configured to receive a pair of collapsible bowls thereon, such that the pair of collapsible bowls are collapsed and secured to an interior surface of the flap by one or more straps for storage.

It is an object of the present invention to provide a piece of pet travel luggage and a pet carrier that includes an interior mesh pocket configured to house food, treats, spoons, medications, and other pet essentials for an extended duration trip.

It is an object of the present invention to provide a pair of collapsible bowls for a piece of pet travel luggage and the pet carrier that are sized to match the size of the pet.

It is an object of the present invention to provide a piece of pet travel luggage and a pet carrier that is "right-sized" or directly sized based on the size and/or weight of the pet.

It is an object of the present invention to provide a pet carrier that can carry, besides the pet, all necessary pet essentials and items for an extended duration trip.

It is an object of the present invention to provide a reusable piece of pet travel luggage that houses all essential supplies to care for and feed a pet, while providing comfort for the user carrying the piece of pet travel luggage.

It is an object of the present invention to provide a piece of pet travel luggage providing a compartment and/or location for every pet essential needed for an extended duration trip.

It is an object of the present invention to provide a piece of pet travel luggage that includes at least one removable dividing panel configured to divide a hollow interior of a body of the piece of pet travel luggage into at least two unsymmetrical sections, such that at least one of the at least two unsymmetrical sections is configured to receive a pair of stackable containers.

It is an object of the present invention to provide a pair of stackable containers sized to match an amount of food needed for the pet based on the weight of the pet and a specified time period for an extended duration trip.

It is an object of the present invention to provide a pet carrier that houses and carries the pet and can be configured to house pet essentials and supplies for an extended duration trip.

It is an object of the present invention to provide a pet carrier that includes two container pouches sized to match an amount of food needed for the pet for one to two days.

It is an object of the present invention to provide a pet carrier that houses and carries the pet and includes a feeding station.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Numerous Figures are provided herein depicting different embodiments of the instant invention. It should be appreciated that each embodiment includes substantially similar components as other embodiments shown.

Figure 1:
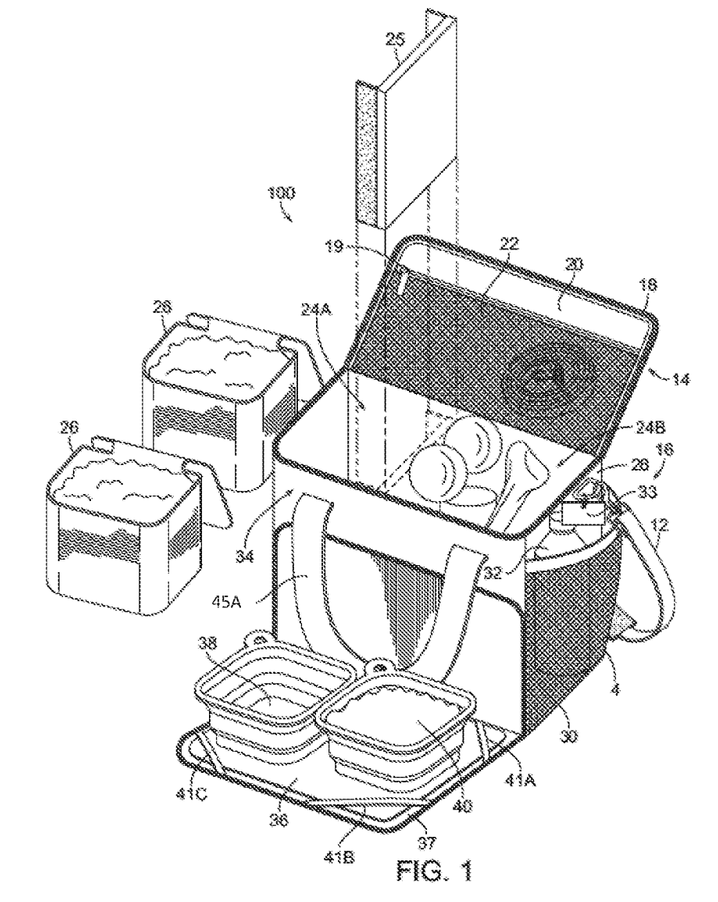
FIG. 1 is a front perspective view of a piece of pet travel luggage configured to organize pet essentials for a trip having an extended duration, according to at least some embodiments described herein.

According to FIG. 1, a piece of pet travel luggage 100 configured to organize pet essentials for a trip having an extended duration is depicted. The pet may include any domesticated animal, such as a dog or a cat.

According to this embodiment, the piece of pet travel luggage 100 may include a flexible walled hauler tote. In some examples, the flexible walled hauler tote may comprise an insulated material and may be formed in a rectangular shape. It should be appreciated that the material comprising the flexible walled hauler tote is not limited to the material described herein. Further, it should be appreciated that the shape of the flexible walled hauler tote is not limited to the shape described herein and Applicant contemplates numerous shapes.

The flexible walled hauler tote includes a body 16 and a lid 14 attached to the body 16. The body 16 includes a hollow interior formed by a first side 4 disposed opposite a second side 6 (not shown), a third side 34 disposed opposite a fourth side 10 (not shown), and a bottom side disposed opposite an opening. The flexible walled hauler tote may also include a first carrier handle 45A affixed to the third side 34 and a second carrier handle 45B (not shown) affixed to the fourth side 10 (not shown), that may allow the user to carry the piece of pet travel luggage 100. A closure means 63 (not shown) may be used to affix a portion of the first carrier handle 45A to a portion of the second carrier handle 45B (not shown). The first carrier handle 45A, the second carrier handle 45B (not shown), and the closure means 63 (not shown) may allow for ease of carrying the piece of pet travel luggage 100.

Figure 4:
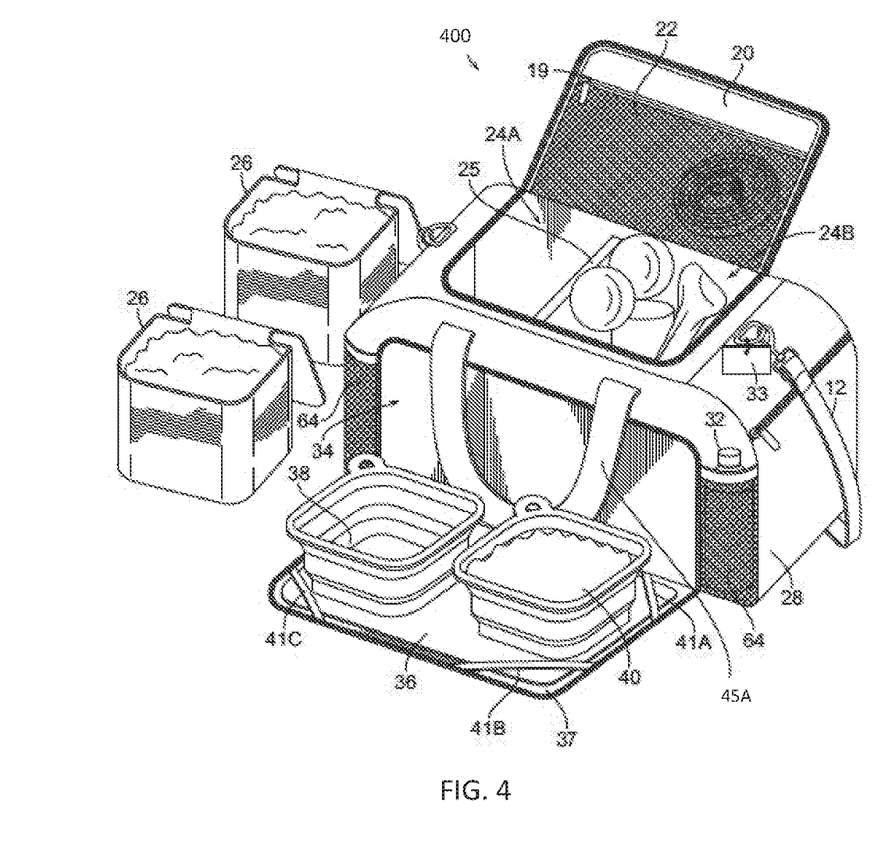
FIG. 4 is a front perspective view of a third embodiment of a piece of pet travel luggage configured to organize pet essentials for a trip having an extended duration, according to at least some embodiments described herein.

According to this embodiment, the lid 14 may be attached to the body 16 at the opening of the fourth side 10 (not shown). In examples, the lid 14 may include an inner surface 20 disposed opposite an outer surface and a pocket 22 (as depicted in FIG. 1 and FIG. 4) formed on the inner surface 20 (as depicted in FIG. 1 and FIG. 4). The pocket 22 (as depicted in FIG. 1 and FIG. 4) may be closable via a fixation element 19 (as depicted in FIG. 1 and FIG. 4). The fixation element 19 (as depicted in FIG. 1 and FIG. 4) may be: male and female snap fasteners, a zipper, one or more buttons, Velcro® strips or patches, adhesives, magnetic fasteners, etc., among other examples.

Once closed, the pocket 22 (as depicted in FIG. 1 and FIG. 4) may house any type of widget, such as a pet supply. Examples of pet supplies may include: pet toys, a measuring cup for food, a leash, pet treats, edible pet chews, pet grooming supplies, pet apparel, a pet collar, a pet harness, and pet waste disposal bags, among others. The piece of pet travel luggage 100 also includes another fixation element 18 configured to secure the lid 14 to the body 16 to open or close the flexible walled hauler tote.

In an example, the piece of pet travel luggage 100 also includes at least one dividing panel 25. The at least one dividing panel 25 is removable or adjustable (as depicted in FIG. 1) and is configured to divide the hollow interior of the body 16 into at least two sections 24A, 24B, respectively. The at least two sections 24, 24B are unsymmetrical. In some examples, the at least one dividing panel 25 is secured within the hollow interior of the body 16 via Velcro®.

As depicted, the at least one dividing panel 25 is a vertical dividing panel that divides the at least two sections 24A, 24B. As an example, a first section 24A of the at least two sections 24A, 24B may receive and house a pair of stackable containers 26 and a second section 24B of the at least two sections 24A, 24B may receive and house one or more widgets. In some examples, the first section 24A may receive and house the one or more widgets and the second section 24B may receive and house the pair of stackable containers 26.

Each container of the pair of stackable containers 26 may be inner-lined. In other examples, each container of the pair of stackable containers 26 may house solid substances. Examples of solid substances may include dry pet food, snacks, and treats, among others. As depicted, the pair of stackable containers 26 are approximately cube shaped, however, other shapes are contemplated. It should be appreciated that each container of the pair of stackable containers 26 is identical in size and is "right-sized," such that a size of each container of the pair of stackable containers 26 is sized to match an amount of food needed for the pet based on the weight of the pet and based on a specified time period for the extended duration trip (e.g., an amount of time away from the home).

For example, a "small-sized dog" may only need a small amount of food, which may be housed in a container (e.g., a container of the pair of stackable containers 26) that has the following dimensions: a length of approximately 4 inches, a width of approximately 4 inches, and a depth of approximately 4 inches (e.g., is 4 inches×4 inches×4 inches in size). In other examples, the pair of stackable containers 26 may include two 5 cup containers, which amounts to 10 cups of food for the small-sized dog. In another example, a "medium-sized" dog may need a larger amount of food than the small dog, which may be housed in the container (e.g., the container of the pair of stackable containers 26) that has the following dimensions: a length of approximately 5 inches, a width of approximately 5 inches, and a depth of approximately 5 inches (e.g., is 5 inches×5 inches×5 inches in size). In other examples, the pair of stackable containers 26 may include two 10 cup containers, which amounts to 20 cups of food for the medium-sized dog. In a further example, a "large-sized" dog may need a larger amount of food than the medium-sized dog, which may be housed in the container (e.g., the container of the pair of stackable containers 26) that has the following dimensions: a length of approximately 6 inches, a width of approximately 6 inches, and a depth of approximately 6 inches (e.g., is 6 inches×6 inches×6 inches in size). In other examples, the pair of stackable containers 26 may include two 15 cup containers, which amounts to 30 cups of food for the large-sized dog. It should be appreciated that these examples are provided for illustration purposes only and the examples provided herein are non-limiting. Since the size of the pair of stackable containers 26 varies based on the weight of the pet and based on the specified time period for the extended duration trip, a depth of the piece of pet travel luggage 100 is directly correlated to a height created by the pair of stackable containers 26 when stacked.

According to further embodiments, the piece of pet travel luggage 100 may also include an adjustable shoulder strap 12 (as depicted in FIG. 1 and FIG. 4) attached to an upper edge of an outer side 28 of the first side 4 and an upper edge of an outer side of the second side 6 (not shown). In some examples, the adjustable shoulder strap 12 (as depicted in FIG. 1 and FIG. 4) may be swivel-connected to the first side 4 and the second side 6 (not shown), respectively.

In all examples, the piece of pet travel luggage 100 includes a feeding station. The feeding station includes a flexible fold down flap 37. The flexible fold down flap 37 is hinged to an outer edge of the third side 34 of the body 16 proximate the bottom side of the piece of pet travel luggage 100. The flexible fold down flap 37 comprises a fabric material that is identical to the material comprising the piece of pet travel luggage 100. The flexible fold down flap 37 is configured for deployment along a horizontal surface. An interior surface of the flexible fold down flap 37 receives and houses a removable mat 36 in place via one or more straps 41A, 41B, 41C, and 41D (not shown) secured to the interior surface of the flexible fold down flap 37. The one or more straps 41A, 41B, 41C, and 41D (not shown) may be elastic straps, but may comprise one or more additional materials not explicitly listed herein.

The removable mat 36 comprises a semi-flexible anti-skid material laminated to a nonporous plastic surface. Further, the removable mat 36 is hand-washable. In an example, the removable mat 36 comprises an ethylene-vinyl acetate (EVA foam) material with a polypropylene (PP) sheet top surface.

Once the flexible fold down flap 37 receives and houses the removable mat 36, the removable mat 36 is configured to receive a pair of collapsible bowls, a first bowl 38 and a second bowl 40. The first bowl 38 and the second bowl 40 may be used to hold liquids, solid food, wet food, or a combination thereof. In additional examples, the first bowl 38 and the second bowl 40 comprise a dishwasher-safe and non-slip plastic material. In examples, the first bowl 38 and the second bowl 40 comprise a non-slip silicone material. It should be appreciated that the material(s) comprising each of the first bowl 38 and the second bowl 40 are not limited to those described herein.

The weight of the filled/loaded piece of pet travel luggage 100 located behind the feeding station ensures that the piece of pet travel luggage 100 does not move when the pet is eating or drinking from the first bowl 38 and/or the second bowl 40. Further, the first bowl 38 and the second bowl 40 are collapsible such that when not in use, the first bowl 38 and the second bowl 40 are collapsed and secured to the interior surface of the flexible fold down flap 37 by the one or more straps 41A, 41B, 41C, and 41D (not shown) secured to the interior surface of the flexible fold down flap 37. Since the size of each of the first bowl 38 and the second bowl 40 is dependent on the size of the pet, a width of the piece of pet travel luggage 100 is a function of the size of the first bowl 38 and the second bowl 40, collapsed and located side by side on the removable mat 36.

Figure 3:
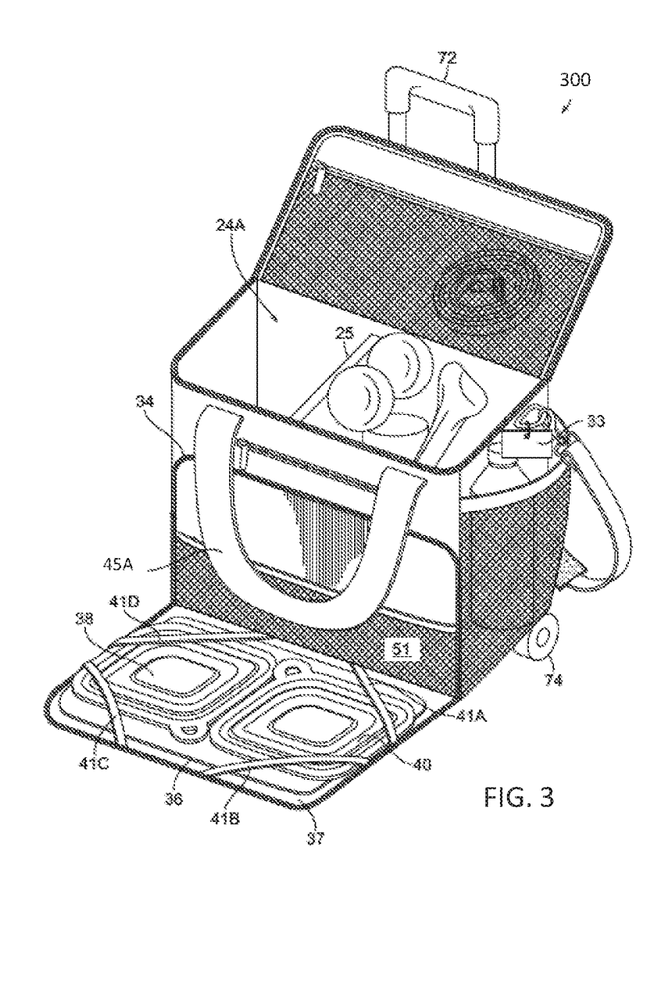
FIG. 3 is a front perspective view of a second embodiment of a piece of pet travel luggage configured to organize pet essentials for a trip having an extended duration, the piece of pet travel luggage utilizing one or more straps to secure collapsible bowls to an interior surface of a fold down flap affixed via a hinge to the piece of pet travel luggage during storage, according to at least some embodiments described herein.

When not in use, the fold down flap 37 may be secured in a closed position to an outer surface of the third side 34 of the body 16 by another fixation element, such as a circumferential zipper. It should be appreciated that the one or more straps 41A, 41B, 41C, and 41D (not shown) are of a precise length and angle to ensure the collapsed first bowl 38 and the second bowl 40 (as depicted in FIG. 3) are secured to the fold down flap 37 when the fold down flap 37 is vertically upright and not in use. In some examples, the one or more straps 41A, 41B, 41C, and 41D (not shown) are affixed at a 30-degree angle. It should be appreciated that the one or more straps 41A, 41B, 41C, and 41D (not shown) are also sized and angle positioned so that when the first bowl 38 and the second bowl 40 are uncollapsed, there is full contact between the bases of the first bowl 38 and the second bowl 40 with the removable mat 36 without the need to remove the removable mat 36 from the one or more straps 41A, 41B, 41C, and 41D (not shown).

Figure 2:
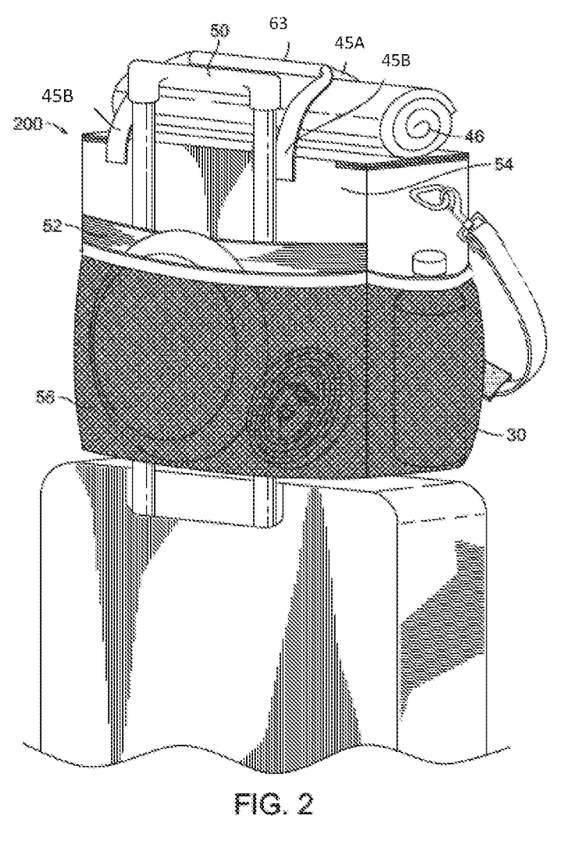
FIG. 2 is a rear perspective view of a first embodiment of a piece of pet travel luggage configured to organize pet essentials for a trip having an extended duration housed on a piece of pet owner's luggage, according to at least some embodiments described herein.
Figure 5:
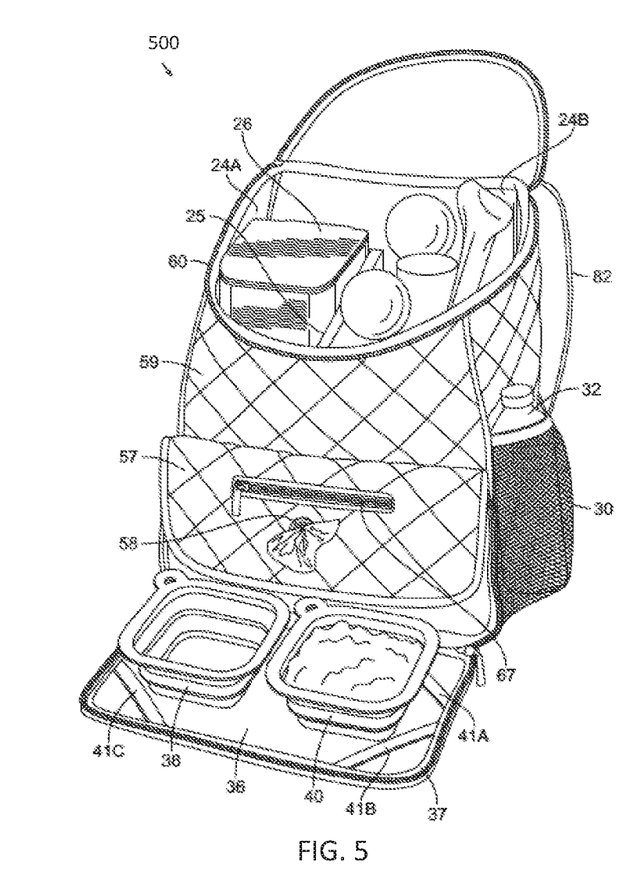
FIG. 5 is a front perspective view of a fourth embodiment of a piece of pet travel luggage configured to organize pet essentials for a trip having an extended duration, the piece of pet travel luggage being in an open position to expose an interior of the piece of pet travel luggage, according to at least some embodiments described herein.

According to other examples, and as depicted, the piece of pet travel luggage 100 may include a flexible pocket 30 (as depicted in FIG. 1, FIG. 2, and FIG. 5) attached to the outer side 28 of the first side 4. The flexible pocket 30 (as depicted in FIG. 1, FIG. 2, and FIG. 5) may comprise a mesh material, a nylon material, and/or another material and may house a widget 32, such as a drink product or a food product. In further examples, the flexible pocket 30 (as depicted in FIG. 1, FIG. 2, and FIG. 5) may include a closure mechanism configured to house the widget 32 within the flexible pocket 30 (as depicted in FIG. 1, FIG. 2, and FIG. 5). It should be appreciated that one or more sides of the piece of pet travel luggage 100 may comprise one or more pockets, such as the flexible pocket 30 (as depicted in FIG. 1, FIG. 2, and FIG. 5) described herein. In further examples, the piece of pet travel luggage 100 may additionally include an identification tag 33 (as depicted in FIG. 1, FIG. 3, and FIG. 4) attached to the adjustable shoulder strap 12 (as depicted in FIG. 1 and FIG. 4).

Thus, as described, the overall size of the piece of pet travel luggage 100 directly correlates to the size of the first bowl 38, the size of the second bowl 40, and the size of each container of the pair of stackable containers 26. A height and depth of the piece of pet travel luggage 100 directly correlates to the height and depth of the pair of stackable containers 26 when stacked and located within a section of the at least two sections 24A, 24B. A width of the piece of pet travel luggage 100 is a function of the size of the first bowl 38 and the second bowl 40, collapsed and located side by side on the removable mat 36. Thus, the piece of pet travel luggage 100 is "right-sized" or directly sized to match a size/weight of the pet.

FIG. 2, FIG. 3, FIG. 4, and FIG. 5 depict embodiments of a piece of pet travel luggage 200, 300, 400, and 500, respectively. It should be appreciated that the piece of pet travel luggage, as depicted in FIG. 2, FIG. 3, FIG. 4, and FIG. 5, includes the at least one dividing panel 25 (as described in FIG. 1) that is removable or adjustable and is configured to divide the hollow interior of the body 16 (not shown) into at least two sections 24A, 24B (as depicted in FIG. 3, FIG. 4, and FIG. 5), respectively. As an example, the first section 24A of the at least two sections 24A, 24B (as depicted in FIG. 3, FIG. 4, and FIG. 5) may receive and house a pair of stackable containers 26 (as depicted in FIG. 4 and FIG. 5) and the second section 24B of the at least two sections 24A, 24B (as depicted in FIG. 3, FIG. 4, and FIG. 5) may receive and house one or more widgets.

It should be appreciated that each container of the pair of stackable containers 26 (as depicted in FIG. 4 and FIG. 5) is identical in size and is "right-sized," such that a size of each container of the pair of stackable containers 26 (as depicted in FIG. 4 and FIG. 5) is sized to match an amount of food needed for the pet based on the weight of the pet and based on a specified time period for the extended duration trip (e.g., an amount of time away from the home). Since the size of the pair of stackable containers 26 (as depicted in FIG. 4 and FIG. 5) varies based on the weight of the pet and based on the specified time period for the extended duration trip, a depth of the piece of pet travel luggage 200, 300, 400, and 500 is directly correlated to a height created by the pair of stackable containers 26 when stacked and located within a section of the at least two sections 24A, 24B (as depicted in FIG. 3, FIG. 4, and FIG. 5).

In other examples, the piece of pet travel luggage 200, 300, 400, and 500 also includes the feeding station, as described in reference to FIG. 1. The feeding station includes the flexible fold down flap 37 (as depicted in FIG. 3, FIG. 4, and FIG. 5) that is hinged to the outer edge of the third side 34 (as depicted in FIG. 3 and FIG. 4) of the body 16 (not shown) proximate the bottom side of the piece of pet travel luggage 200, 300, 400, and 500. The flexible fold down flap 37 (as depicted in FIG. 3, FIG. 4, and FIG. 5) is configured for deployment along a horizontal surface. The interior surface of the flexible fold down flap 37 (as depicted in FIG. 3, FIG. 4, and FIG. 5) receives and houses the removable mat 36 (as depicted in FIG. 3, FIG. 4, and FIG. 5) in place via the one or more straps 41A, 41B, 41C, and 41D (as depicted in FIG. 3) secured to the interior surface of the flexible fold down flap 37 (as depicted in FIG. 3, FIG. 4, and FIG. 5). The removable mat 36 (as depicted in FIG. 3, FIG. 4, and FIG. 5) comprises the semi-flexible anti-skid material laminated to the nonporous plastic surface. Further, the removable mat 36 (as depicted in FIG. 3, FIG. 4, and FIG. 5) is hand-washable. In an example, the removable mat 36 (as depicted in FIG. 3, FIG. 4, and FIG. 5) comprises the EVA foam material with the PP sheet top surface.

Once the flexible fold down flap 37 (as depicted in FIG. 3, FIG. 4, and FIG. 5) receives and houses the removable mat 36 (as depicted in FIG. 3, FIG. 4, and FIG. 5), the removable mat 36 (as depicted in FIG. 3, FIG. 4, and FIG. 5) is configured to receive the pair of collapsible bowls that includes the first bowl 38 (as depicted in FIG. 3, FIG. 4, and FIG. 5) and the second bowl 40 (as depicted in FIG. 3, FIG. 4, and FIG. 5). The first bowl 38 (as depicted in FIG. 3, FIG. 4, and FIG. 5) and the second bowl 40 (as depicted in FIG. 3, FIG. 4, and FIG. 5) comprise a dishwasher-safe and non-slip silicone material.

Further, the first bowl 38 (as depicted in FIG. 3, FIG. 4, and FIG. 5) and the second bowl 40 (as depicted in FIG. 3, FIG. 4, and FIG. 5) are collapsible such that when not in use, the first bowl 38 (as depicted in FIG. 3, FIG. 4, and FIG. 5) and the second bowl 40 (as depicted in FIG. 3, FIG. 4, and FIG. 5) are collapsed and secured to the interior surface of the flexible fold down flap 37 (as depicted in FIG. 3, FIG. 4, and FIG. 5) by the one or more straps 41A, 41B, 41C, and 41D secured to the interior surface of the flexible fold down flap 37 (as depicted in FIG. 3, FIG. 4, and FIG. 5). It should be appreciated that the one or more straps 41A, 41B, 41C, and 41D are also sized and angle positioned so that when the first bowl 38 (as depicted in FIG. 3, FIG. 4, and FIG. 5) and the second bowl 40 (as depicted in FIG. 3, FIG. 4, and FIG. 5) are uncollapsed, there is full contact between the bases of the first bowl 38 (as depicted in FIG. 3, FIG. 4, and FIG. 5) and the second bowl 40 (as depicted in FIG. 3, FIG. 4, and FIG. 5) with the removable mat 36 (as depicted in FIG. 3, FIG. 4, and FIG. 5) without the need to remove the removable mat 36 (as depicted in FIG. 3, FIG. 4, and FIG. 5) from the one or more straps 41A, 41B, 41C, and 41D.

Since the size of the first bowl 38 (as depicted in FIG. 3, FIG. 4, and FIG. 5) and the second bowl 40 (as depicted in FIG. 3, FIG. 4, and FIG. 5) is dependent on the size of the pet, the width of the piece of pet travel luggage 200, 300, 400, and 500 is a function of the size of the first bowl 38 (as depicted in FIG. 3, FIG. 4, and FIG. 5) and the second bowl 40 (as depicted in FIG. 3, FIG. 4, and FIG. 5), collapsed and located side by side on the removable mat 36 (as depicted in FIG. 3, FIG. 4, and FIG. 5).

Thus, as described, the overall size of the piece of pet travel luggage 200, 300, 400, and 500 directly correlates to the size of the first bowl 38 (as depicted in FIG. 3, FIG. 4, and FIG. 5), the size of the second bowl 40 (as depicted in FIG. 3, FIG. 4, and FIG. 5), and the size of each container of the pair of stackable containers 26 (as depicted in FIG. 4 and FIG. 5). The height and depth of the piece of pet travel luggage 200, 300, 400, and 500 directly correlates to the height and depth of the pair of stackable containers 26 when placed in a section of the at least two sections 24A, 24B (as depicted in FIG. 3, FIG. 4, and FIG. 5) and stacked. The width of the piece of pet travel luggage 200, 300, 400, and 500 is a function of the size of the first bowl 38 (as depicted in FIG. 3, FIG. 4, and FIG. 5) and the second bowl 40 (as depicted in FIG. 3, FIG. 4, and FIG. 5), collapsed and located side by side on the removable mat 36 (as depicted in FIG. 3, FIG. 4, and FIG. 5). Thus, the piece of pet travel luggage 200, 300, 400, and 500 is "right-sized" or directly sized to match the size/weight of the pet.

According to FIG. 2, the piece of pet travel luggage 200 may further include a first carrier handle 45A and a second carrier handle 45B. The first carrier handle 45A may be affixed, at at least two locations, located near the lid 14 (not shown) on the outer surface 54 of the fourth side 10 (not shown). The second carrier handle 45B may be affixed, at at least two locations, located near the lid 14 (not shown) on the outer surface of the third side 34 (not shown) of the body 16 (not shown). A closure means 63 may be used to affix a portion of the first carrier handle 45A to a portion of the second carrier handle 45B. The first carrier handle 45A, the second carrier handle 45B, and the closure means 63 may allow for ease of carrying the piece of pet travel luggage 200.

For example, when the lid 14 (not shown) is affixed to the body 16 (not shown) such that the piece of pet travel luggage 200 is in a closed position, the user may wish to place an object 46 (e.g., a towel, a mat, etc.) on top of the lid 14 (not shown). The first carrier handle 45A and the second carrier handle 45B may be held in one hand of the user, allowing the user to carry the piece of pet travel luggage 200 with the object 46 on top.

Moreover, the piece of pet travel luggage 200 may also include a luggage handle sleeve 52 located on and affixed to the outer surface 54 of the fourth side 10 (not shown) at at least two locations. The luggage handle sleeve 52 may be configured as an "add-a-bag" strap, which allows for the piece of pet travel luggage 200 to rest on top of a piece of pet owner's luggage. The piece of pet owner's luggage may also include an extendable handle 50 that extends towards the top side and in a direction opposite the one or more wheels. The extendable handle 50 of the piece of pet owner's luggage may be configured to extend through the luggage handle sleeve 52 of the piece of pet travel luggage 200. When the extendable handle 50 of the piece of pet owner's luggage is extended, this allows the user to pull the piece of pet owner's luggage with the piece of pet travel luggage 200 resting on top of the piece of pet owner's luggage, without the user having to hold the piece of pet travel luggage 200 separately.

In other examples, the piece of pet travel luggage 200 may comprise a rear flexible pocket 56 affixed to the outer surface 54 of the fourth side 10 (not shown) at a bottom edge, a first side edge located near the first side, and a second side edge located near the second side, leaving an opening located proximate the lid 14 (not shown). In some examples, the rear flexible pocket 56 may be configured as a sleeve. In some examples, the sleeve may house wet or muddy items.

According to FIG. 3, the piece of pet travel luggage 300 is depicted as a wheeled trolley bag. The piece of pet travel luggage 300 may include wheels 74 affixed to an outer surface of the bottom side of the body 16 (not shown) of the flexible walled hauler tote. The wheels 74 may include at least two wheels, but may include other numbers and/or configurations of wheels.

Moreover, the piece of pet travel luggage 300 may also include an extendable luggage handle 72 affixed to an outer surface of the fourth side 10 (not shown) of the body of the piece of pet travel luggage 300. The extendable luggage handle 72 may extend towards an opening and in a direction opposite the bottom side of the body of the piece of pet travel luggage 300. Further, the extendable luggage handle 72 may collapse into a recess affixed to the outer surface of the fourth side 10 (not shown) when not in use. In examples, when extended, the user may pull the piece of pet travel luggage 300 by placing the user's hand on the extendable luggage handle 72, where the wheels 74 allow for movement of the piece of pet travel luggage 300. In some examples, and as depicted in FIG. 3, the third side 34 of the body 16 may comprise a mesh pocket 51 configured to house objects.

According to FIG. 4, the piece of pet travel luggage 400 for pet supplies is depicted as a duffle bag. The piece of pet travel luggage 400 includes the fold down flap 37 located on the outer surface of the third side 34 of the body 16 (not shown) between one or more additional pockets 64. The one or more additional pockets 64 may be flexible and may comprise a mesh material, according to some examples. The one or more additional pockets 64 may further be configured to house the widget 32.

According to FIG. 5, the piece of pet travel luggage 500 is depicted as a backpack. However, other styles of the piece of pet travel luggage 500, such as a trolley backpack, are contemplated herein. The piece of pet travel luggage 500 may include a body 59 and a lid. The body 59 comprises a hollow interior compartment formed by a first side disposed opposite a second side, a third side disposed opposite a fourth side, and a bottom side disposed opposite an opening 60. The lid may be attached to the body 59 at the opening 60. A fixation means, such as a zipper, may be used to secure the body 59 to the lid to close or open the piece of pet travel luggage 500.

The piece of pet travel luggage 500 may also include one or more straps 82 attached to the fourth side at a first location proximate the opening 60 and a second location proximate the bottom side. In some examples, the piece of pet travel luggage 500 may include two straps.

Moreover, the piece of pet travel luggage 500, on the third side, may further comprise a flap 57 located over the feeding station. The flap 57 may include a zippered pocket configured to house at least a supply of bags and a dispenser configured to receive the supply of bags from the zippered pocket. In some examples, the zippered pocket may house other items, such as a cell phone, wallet, identification cards, and/or money. The supply of bags may include pet waste disposal bags. The dispenser may include an opening 58 located on the outer side of the flap 57 such that a pet owner or user may pull a bag from the opening 58 for use.

Figure 6:
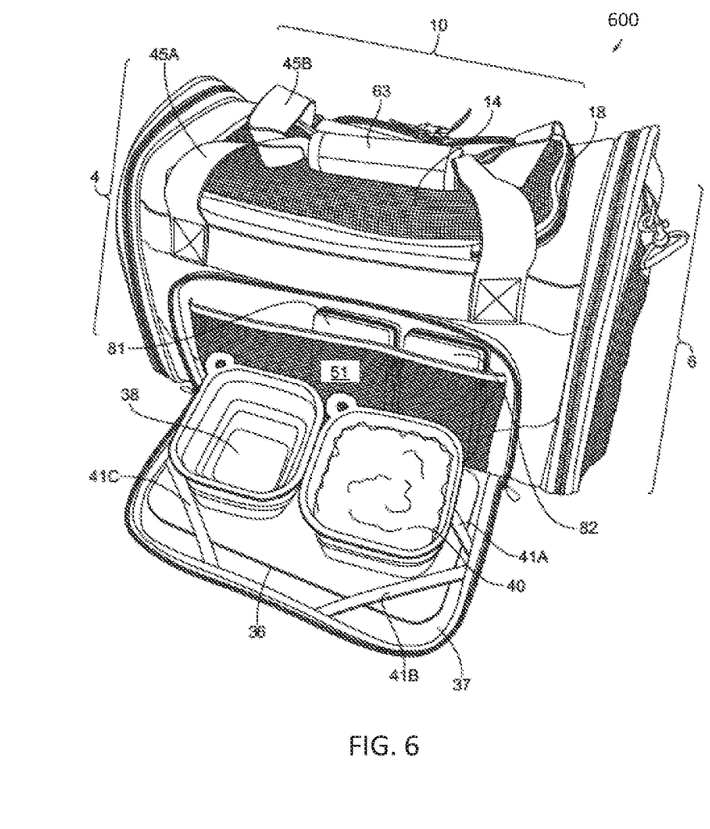
FIG. 6 is a front perspective view of a pet carrier, according to at least some embodiments disclosed herein.
Figure 7:
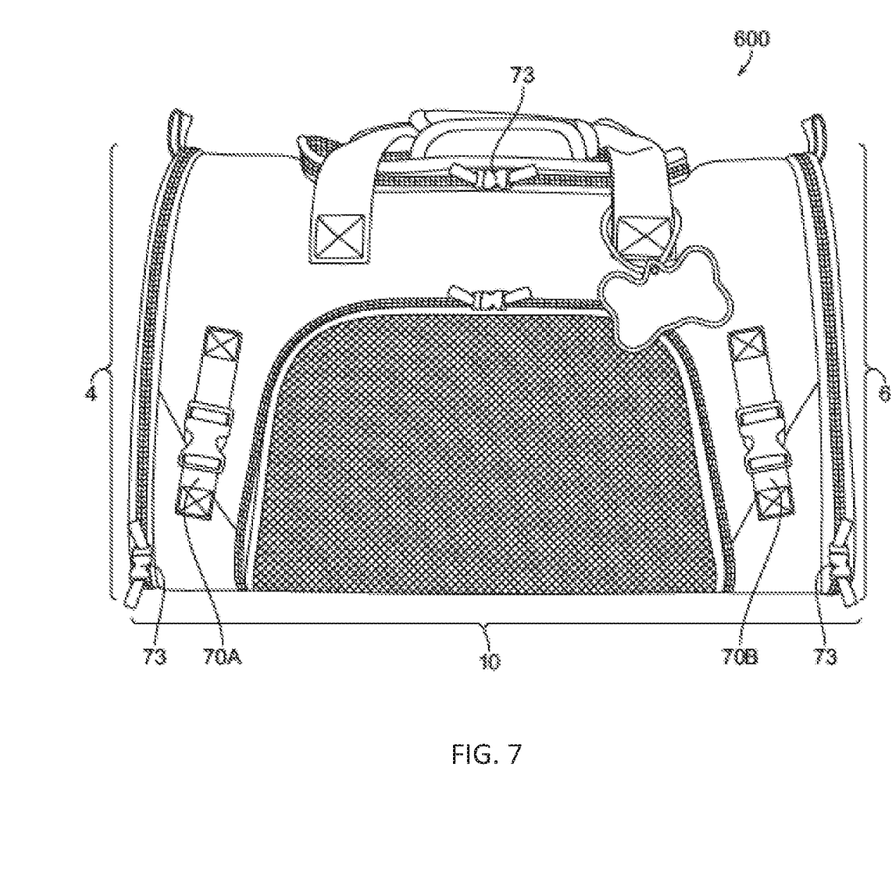
FIG. 7 is a rear perspective view of a pet carrier, according to at least some embodiments disclosed herein.

According to FIG. 6 and FIG. 7, a pet carrier 600 for a pet and pet supplies are depicted. It should be appreciated that other styles of the pet carrier 600, such as a backpack version of the pet carrier 600, are contemplated herein. The hollow interior of the body of the pet carrier 600 may be utilized to house and/or transport the pet. The hollow interior of the body of the pet carrier 600 may comprise a removable mat. The removable mat may be secured within the interior of the pet carrier 600 via one or more fixation elements. The removable mat may be detached for washing or cleaning. The removable mat may be plush or may include another high pile fabric, such as faux Sherpa, in some examples. Moreover, a tether may be affixed to the interior bottom of the pet carrier 600. In some examples, the leash may comprise a fixation means that allows for fixation to a collar or a harness of the pet residing inside of the pet carrier 600.

Further, a bottom side of the body of the pet carrier 600 may comprise one or more traction elements to ensure that the pet carrier 600 does not move when placed on a surface. The one or more traction elements are not limited by quantity/plurality, shape, size, and/or dispersion.

The opening 18 may be configured to open the lid 14 via one or more fixation means, described infra. Further, it should be appreciated that one or more of the first side 4, the second side 6, the third side 34 (not shown) and the fourth side 10 may comprise a portion of transparent material (e.g., such as mesh). As an example, and as depicted in FIG. 6, an outer surface of the third side 34 (not shown) may comprise the mesh pocket 51 configured to house objects. As shown in FIG. 6, the mesh pocket 51 may house one or more food pouches (e.g., a first food pouch 81 and a second food pouch 82). Furthermore, the one or more food pouches (e.g., the first food pouch 81 and the second food pouch 82) are not limited to two pouches and any quantity of the one or more food pouches is contemplated herein.

In additional examples, the first food pouch 81 and the second food pouch 82 may each comprise a zipper or another means by which to close the first food pouch 81 and the second food pouch 82, respectively, to ensure objects or contents remain inside of the first food pouch 81 and the second food pouch 82, respectively. In some examples, the first food pouch 81 and the second food pouch 82 may each be rectangular in shape. In other examples, the first food pouch 81 and the second food pouch 82 may each be approximately 6 inches in length. It should be appreciated that the shape and configuration of the first food pouch 81 and the second food pouch 82 is not limited to the shapes and configurations described explicitly herein.

The pet carrier 600 may further include a first carrier handle 45A and a second carrier handle 45B affixed to an outer surface of the third side 34 (not shown) and the fourth side 10 of the body, respectively. A closure means 63 may be used to affix a portion of the first carrier handle 45A to a portion of the second carrier handle 45B. The first carrier handle 45A, the second carrier handle 45B, and the closure means 63 may allow for ease of carrying the pet carrier 600.

Similar to the piece of pet travel luggage 200 (of FIG. 2), the pet carrier 600 may also include a luggage handle sleeve 52 (not shown) located on and affixed to an outer surface of the fourth side 10 at at least two locations. The luggage handle sleeve 52 (not shown) may be configured as an "add-a-bag" strap, which allows for the pet carrier 600 to rest on top of a piece of pet owner's luggage such that the piece of pet owner's luggage may include the extendable handle 50 (not shown) that is configured to extend through the luggage handle sleeve 52 (not shown) of the pet carrier 600 to allow the user to pull the piece of pet owner's luggage with the pet carrier 600 resting on top of the piece of pet owner's luggage, without the user having to hold the pet carrier 600 separately.

A rear view of the pet carrier 600 is depicted in FIG. 7. The pet carrier 600 may comprise one or more seat belt straps 70A and 70B affixed to an outer surface of the fourth side 10. A seat belt in a vehicle may horizontally be placed through the one or more seat belt straps 70A and 70B when transporting the pet in the hollow interior of the body of the pet carrier 600 so as to maintain the position and location of the pet carrier 600 during travel in the vehicle and ensure the safety of the pet during travel.

Moreover, as depicted in FIG. 7, the pet carrier 600 may comprise one or more closure mechanisms (such as zippers) to close or open one or more openings of the pet carrier 600 when necessary. As shown, a first opening is depicted on the first side 4, a second opening is depicted on the second side 6, and a third opening is depicted on the lid. Each of the one or more openings may also include a fixation element 73 configured to secure the closure mechanism in a closed position during travel.

The pet carrier 600 of FIG. 6 and FIG. 7 comprises the feeding station, as described infra. The feeding station (as depicted in FIG. 6) includes the flexible fold down flap 37 that is hinged to an outer edge of the third side 34 (not shown) of the body proximate the bottom side of the pet carrier 600. The flexible fold down flap 37 is configured for deployment along a horizontal surface. The interior surface of the flexible fold down flap 37 receives and houses the removable mat 36 in place via the one or more straps 41A, 41B, 41C, and 41D (not shown) secured to the interior surface of the flexible fold down flap 37.

Once the flexible fold down flap 37 receives and houses the removable mat 36, the removable mat 36 is configured to receive the pair of collapsible bowls, including the first bowl 38 and the second bowl 40. The first bowl 38 and the second bowl 40 are collapsible such that when not in use, the first bowl 38 and the second bowl 40 are collapsed and secured to the interior surface of the flexible fold down flap 37 by the one or more straps 41A, 41B, 41C, and 41D (not shown) secured to the interior surface of the flexible fold down flap 37. It should be appreciated that the position of the one or more straps 41A, 41B, 41C, and 41D (not shown) allows the first bowl 38 and the second bowl 40 to be pulled up with full base contact with the removable mat 36. Since the size of the first bowl 38 and the second bowl 40 is dependent on the size of the pet, a width of the feeding station on pet carrier 600 is a function of the size of the first bowl 38 and the second bowl 40, collapsed and located side by side on the removable mat 36.

Thus, as described, the length by width by depth of the pet carrier 600 is directly correlated to the size and weight of the pet it is designed to transport. The width of the feeding station on pet carrier 600 is a function of the size of the first bowl 38 and the second bowl 40, collapsed and located side by side on the removable mat 36. Thus, the pet carrier 600 is "right-sized" or directly sized to match a size/weight of the pet the pet carrier 600 is designed to transport.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A piece of pet travel luggage configured to organize pet essentials, the piece of pet travel luggage comprising:
   a flexible walled hauler tote comprising:
      a body comprising a hollow interior compartment formed by a first side disposed opposite a second side, a third side disposed opposite a fourth side, and a bottom side disposed opposite an opening; and
      a lid attached to the body at the opening of the fourth side;
   a first fixation element configured to secure the lid to the body to open or close the flexible walled hauler tote;
   at least one removable dividing panel configured to divide the hollow interior compartment into at least two sections, wherein at least one of the at least two sections is configured to receive a pair of containers; and
   a feeding station comprising a flexible fold down flap hinged to an outer edge of the third side proximate the bottom side, the flexible fold down flap being configured for deployment along a horizontal surface such that an interior surface of the flexible fold down flap receives and houses a removable mat, wherein the removable mat is retained on an interior surface of the flexible fold down flap by a plurality of straps,
   wherein each of the plurality of straps are located in a separate corner area of the flexible fold down flap, and wherein each of the plurality of straps have a first end and a second end with the first end and the second end of each of the plurality of straps being coupled to adjacent edges of the flexible fold down flap;

wherein the removable mat is configured to receive a pair of collapsible bowls with each of the pair of collapsible bowls having a non-skid base, and wherein the flexible fold down flap is secured in a closed position to an outer surface of the third side by a second fixation element.

2. The piece of pet travel luggage of claim 1, wherein the at least two sections of the hollow interior compartment are unsymmetrical, and wherein the at least one removable dividing panel is a vertical dividing panel.

3. The piece of pet travel luggage of claim 1, wherein the pair of containers are stackable in the at least one of the at least two sections.

4. The piece of pet travel luggage of claim 1, wherein the pair of collapsible bowls comprise a dishwasher-safe material, and wherein the pair of collapsible bowls comprise a silicone material.

5. The piece of pet travel luggage of claim 1, wherein each container of the pair of containers is identical in size.

6. The piece of pet travel luggage of claim 5, wherein a size of each container of the pair of containers is sized to match an amount of food needed for the pet based on the weight of the pet and a specified time period.

7. The piece of pet travel luggage of claim 1, wherein each bowl of the pair of collapsible bowls is identical in size.

8. The piece of pet travel luggage of claim 7, wherein a size of each bowl of the pair of collapsible bowls is selected based on a size of the pet.

9. The piece of pet travel luggage of claim 1, wherein a size of the piece of pet travel luggage is selected based on a size of the pair of containers and a size of the pair of collapsible bowls.

10. The piece of pet travel luggage of claim 1, wherein the removable mat comprises an upper surface of a nonporous polymer.

11. The piece of pet travel luggage of claim 1, wherein the plurality of straps are configured to retain an upper surface of the collapsible bowls when the collapsible bowls are in a collapsed position.

12. A pet carrier configured to transport a pet, the pet carrier comprising:
a body comprising a hollow interior compartment formed by a first side disposed opposite a second side, a third side disposed opposite a fourth side, and a bottom side disposed opposite an opening;
a lid attached to the body at the opening of the fourth side;
a first fixation element configured to secure the lid to the body to open or close the body; and
a feeding station comprising a flexible fold down flap hinged to an outer edge of the third side proximate the bottom side, the flexible fold down flap being configured for deployment along a horizontal surface such that an interior surface of the flexible fold down flap receives and houses a removable mat, wherein the removable mat is retained on an interior surface of the flexible fold down flap by a plurality of straps,
wherein each of the plurality of straps are located in a separate corner area of the flexible fold down flap, and
wherein each of the plurality of straps have a first end and a second end with the first end and the second end of each of the plurality of straps being coupled to adjacent edges of the flexible fold down flap;
wherein the removable mat is configured to receive a pair of collapsible bowls with each of the pair of collapsible bowls having a non-skid base, and wherein the flexible fold down flap is secured in a closed position to an outer surface of the third side by a second fixation element.

13. The pet carrier of claim 12, wherein each bowl of the pair of collapsible bowls houses at least a food or a liquid.

14. The pet carrier of claim 12, wherein the flexible fold down flap comprises a fabric material.

15. The pet carrier of claim 12, wherein the removable mat comprises a semi-flexible anti-skid material laminated to a nonporous plastic surface.

16. The pet carrier of claim 15, wherein the removable mat wherein the semi-flexible anti-skid material is hand washable.

17. The pet carrier of claim 15, wherein the semi-flexible anti-skid material includes an ethylene-vinyl acetate (EVA foam) with a polypropylene (PP) sheet top surface.

* * * * *